United States Patent [19]
Worden et al.

[11] Patent Number: 5,562,178
[45] Date of Patent: Oct. 8, 1996

[54] REAR DRIVE ELECTRIC VEHICLE

[75] Inventors: James D. Worden, North Andover; Edward D. Trembly, Waltham, both of Mass.

[73] Assignee: Solectria Corporation, Wilmington, Mass.

[21] Appl. No.: 438,111

[22] Filed: May 8, 1995

[51] Int. Cl.$^6$ .................................................. B60K 1/00
[52] U.S. Cl. ........................ 180/291; 180/65.1; 180/65.6
[58] Field of Search ................. 180/65.1, 65.6, 180/291, 292, 297, 299, 55, 56, 57, 60, 62

[56] References Cited

U.S. PATENT DOCUMENTS

| | | | |
|---|---|---|---|
| 2,091,652 | 8/1937 | Porsche | 180/62 |
| 2,105,153 | 1/1938 | Ledwinka | 180/62 |
| 2,784,794 | 3/1957 | Barenyi | 180/62 |
| 3,401,763 | 9/1968 | Rolt | 180/292 |
| 3,521,722 | 7/1970 | Dimonte | 180/65.1 |
| 3,902,565 | 9/1975 | Farrall | 180/65.1 |
| 3,915,251 | 10/1975 | Kassekert et al. | 180/65.1 |
| 4,320,814 | 3/1982 | Middelhoven | 180/299 |
| 5,392,873 | 2/1995 | Masuyama et al. | 180/68.5 |

FOREIGN PATENT DOCUMENTS

| | | | |
|---|---|---|---|
| 2277062 | 10/1994 | United Kingdom | 180/65.1 |
| 9011905 | 10/1990 | WIPO | 180/65.1 |

OTHER PUBLICATIONS

Solectria E-10 Fleet Pickup; Solectria Corporation, company brochure; Copyright 1993.

Primary Examiner—Eric D. Culbreth
Assistant Examiner—Min Yu
Attorney, Agent, or Firm—Hayes, Soloway, Hennessey, Grossman & Hage, P.C.

[57] ABSTRACT

A new vehicle layout in which one or more electric driving motors are located to the rear of the vehicle's rear axle, and connected to a drive shaft that drives the vehicle's rear axle through a rearwards facing differential. This arrangement leaves the entire underside of the vehicle running from the front axle available to accommodate batteries or other large bulky devices.

4 Claims, 5 Drawing Sheets

5,562,178

REAR DRIVE ELECTRIC VEHICLE

BACKGROUND OF THE INVENTION

1. Field of the Invention

The present invention relates to electric vehicles. The invention has particular utility in the case of battery-powered electric vehicles, and will be described in connection with such utility, although other utilities are contemplated. For example, the invention advantageously may be employed in connection with fuel-cell or flywheel-powered electric vehicles, as well as hybrid or the like electric vehicles.

2. Description of the Prior Art

Electric vehicles are being cited with increasing regularity as an answer to the air pollution problems that are plaguing urban areas. Several states in the United States have mandated that by 1998, two percent of the vehicles sold will have to be zero-emission vehicles. currently, the only vehicles that meet this criteria are battery-powered electric vehicles. While several companies are believed to be developing new designs for battery-powered vehicles from the ground up, in order to meet the 1998 zero-emission mandates, manufacturers have looked to converting existing gasoline-powered vehicles. Typical conversion involves removing the gasoline engine, transmission, drive shaft, gas tank, associated gauges and controls, etc. and substituting a battery pack, one or more electric motors, and associated gauges and controls. Also, heavy components such as axles may be replaced with lighter weight components in order to conserve weight.

For a given vehicle, the vehicle's range is substantially directly proportional to the amount of stored electric energy. Thus, the greater the number and size of batteries, the greater the potential range. However, batteries are heavy and bulky. Thus, it is not possible to simply mount all the batteries, for example, in the engine compartment in place of the gasoline engine since this would result in a vehicle that is much too front heavy. Accordingly, it has been an engineering challenge to locate an adequate number of batteries in an electric vehicle conversion.

It is thus an object of the invention to overcome the aforesaid and other disadvantages of the prior art, and to provide an improved battery-powered electric vehicle.

SUMMARY OF THE INVENTION

The present invention provides a new vehicle layout in which one or more electric driving motors are located to the rear of the vehicle's rear axle, and connected to a drive shaft that drives the vehicle's rear axle through a rearwards facing differential. This arrangement leaves the entire underside of the vehicle running from in front of the rear axle available to accommodate batteries.

BRIEF DESCRIPTION OF THE DRAWINGS

Yet other objects and advantages of the present invention will become clear from the detailed description following wherein like numerals depict like parts, and wherein.

DETAILED DESCRIPTION OF THE PREFERRED EMBODIMENTS

Figure 1:
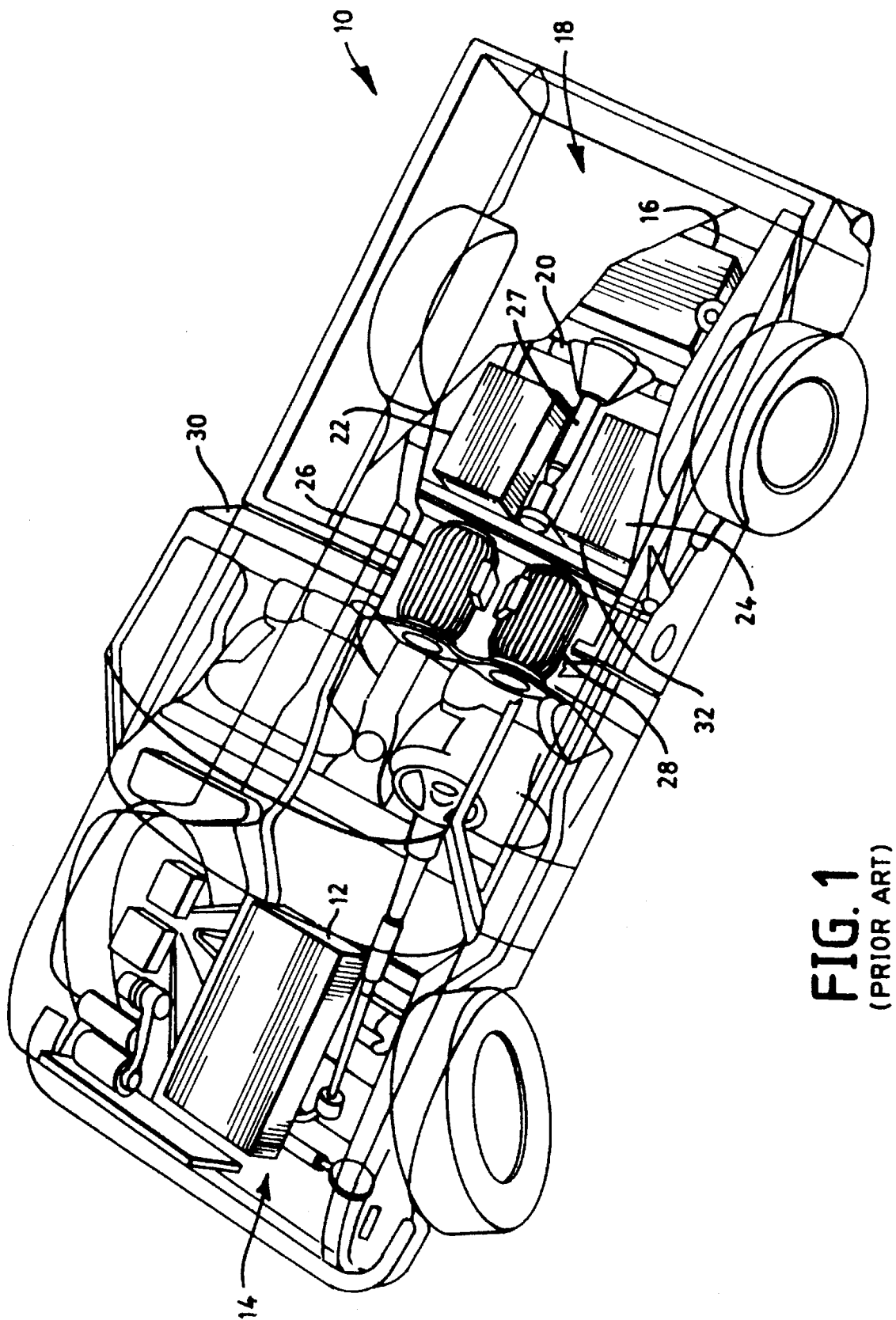
FIG. 1 is a perspective view, in partial cross-section, schematically showing the construction of a conventional battery-powered electric vehicle conversion in accordance with the prior art.
Figure 2:
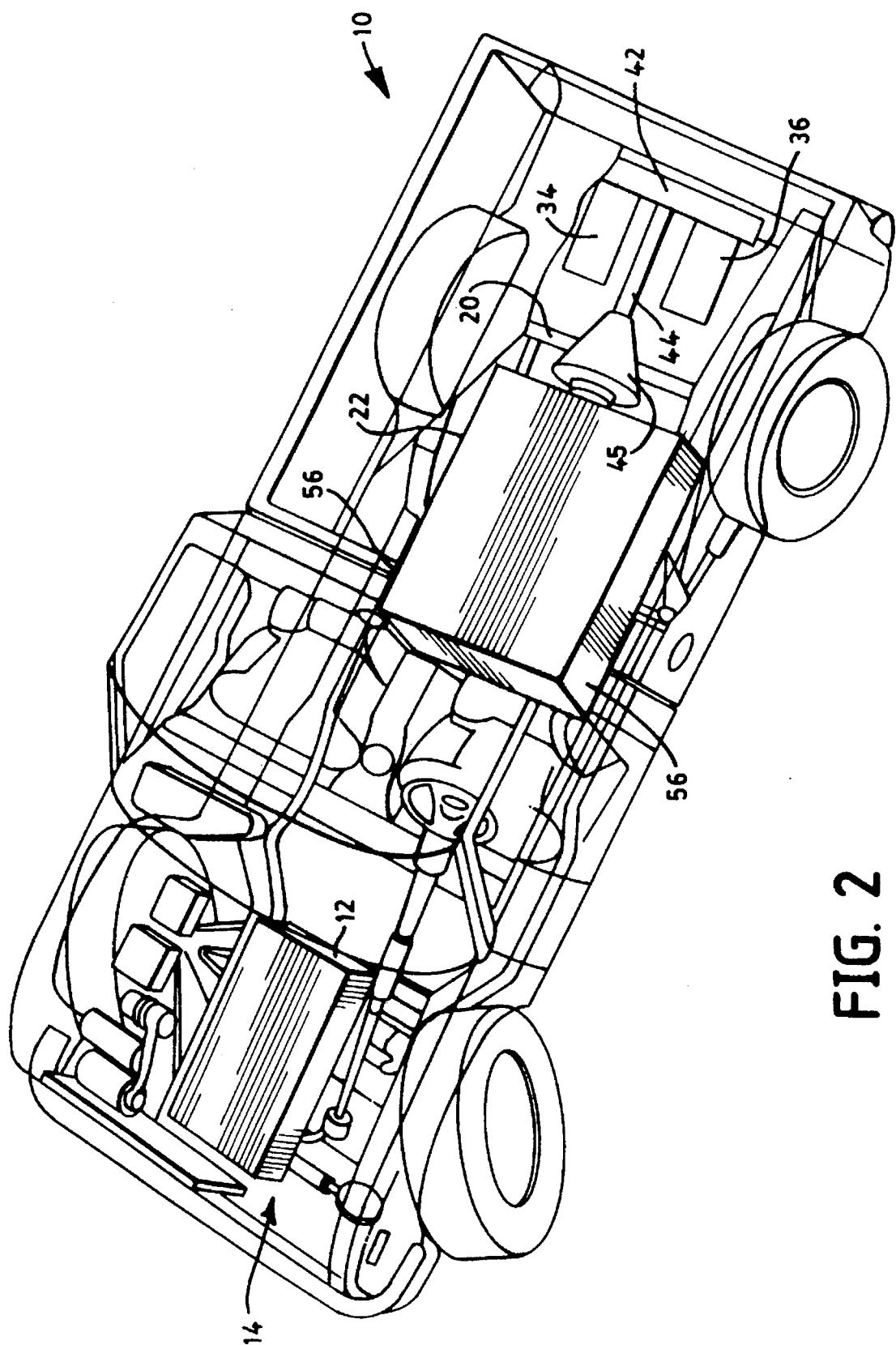
FIG. 2 is a view similar to FIG. 1 of a battery-powered electric vehicle in accordance with a first embodiment of the present invention.
Figure 3:
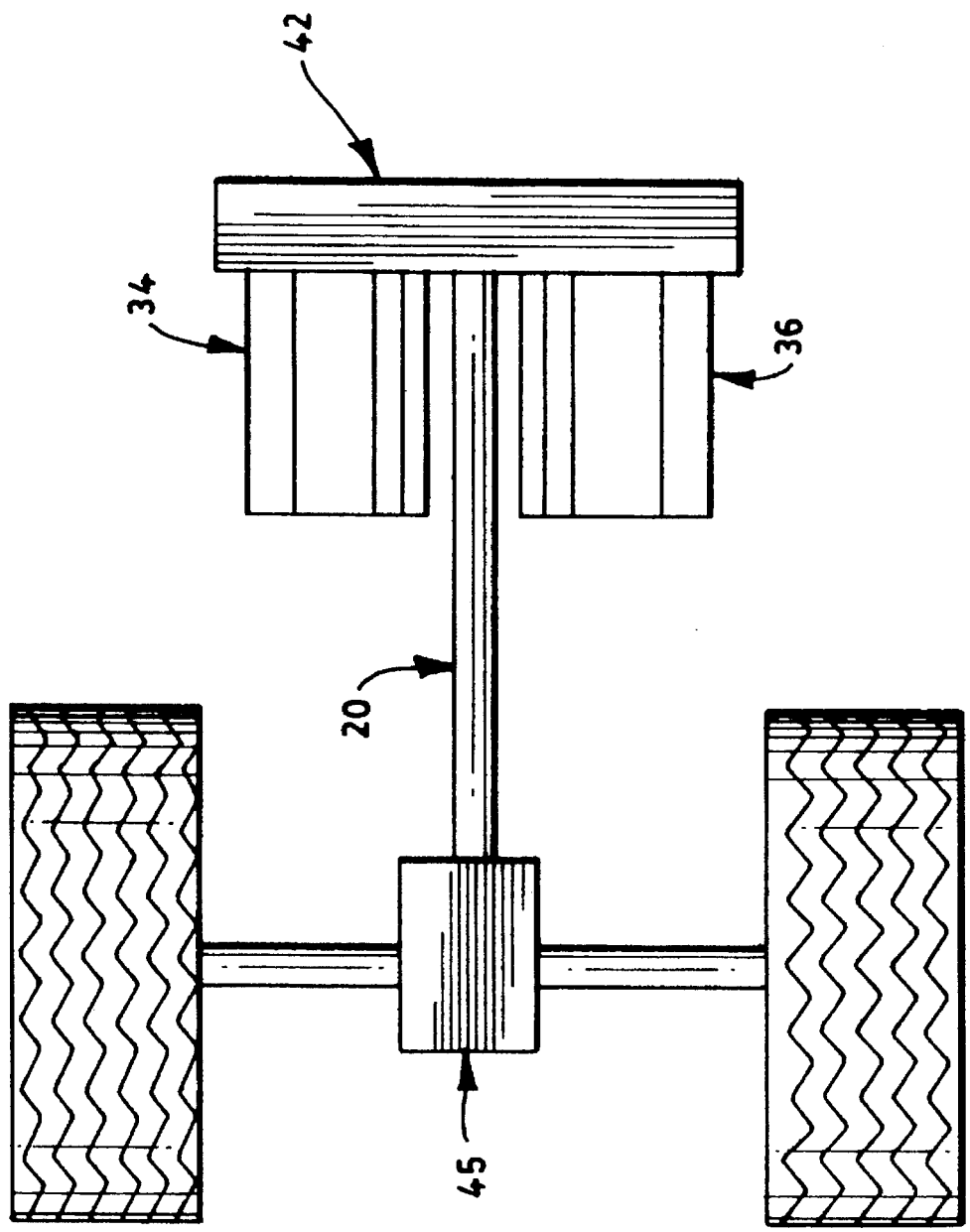
FIG. 3 is a schematic plan view illustrating the manner in which the electric motors and drive train components of the electric vehicle of FIG. 2 are arranged.

In the following detailed description, the conversion vehicle comprises an S-10 fleet side pickup truck available from the Chevrolet Division of General Motors. Referring in particular to FIG. 1, a conventional battery-powered electric vehicle such as Solectria's E-10 fleet pickup comprises a standard pickup truck indicated generally at 10, and comprising a plurality of battery boxes including a first battery box 12 located in the engine compartment 14 in place of the gasoline-powered engine. A second battery box 16 is located under the truck bed 18 behind the rear axle 20. A pair of battery boxes 22, 24 are also located under bed 18, immediately forward of axle 20, to either side of drive shaft 24. A pair of twin AC induction motors 26, 28 are located under bed 18 immediately behind the cab 30, and connected through transmission 32 to drive shaft 24.

Figure 4:
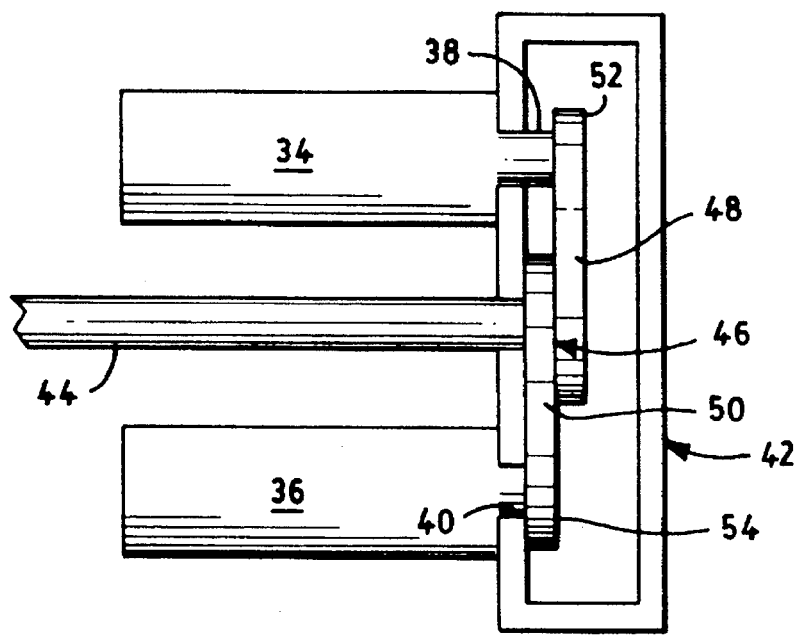
FIG. 4 is an enlarged fragmentary sectional view showing details of the construction of the transmission of the FIG. 3 embodiment.
Figure 5:
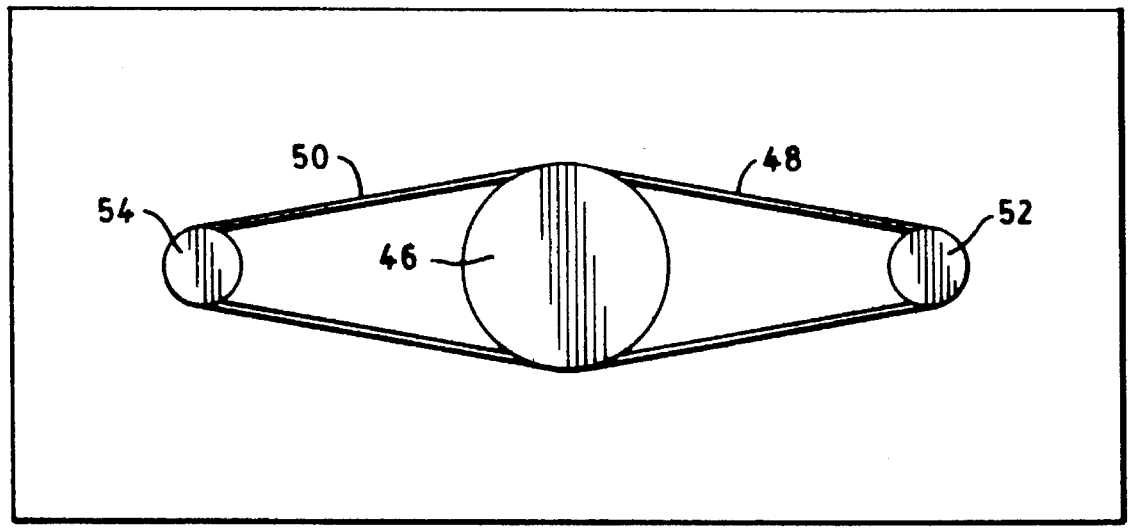
FIG. 5 is a side elevational view showing details of the transmission of the FIG. 3 embodiment, with the cover removed.

Referring to FIGS. 2–5, in accordance with the present invention, electric motors 34, 36 are located behind the rear axle 20 and oriented at right angles to the axle. Referring in particular to FIG. 4, motors 34, 36 are arranged so that their shafts 38, 40 point away from axle 20. Arranging the motors so that their shafts point rearwardly permits the use of a longer drive shaft than otherwise would be possible. Using a longer drive shaft in turn results in less angular misalignment of the drive shaft during suspension travel. Torque from motors 34, 36 is delivered to the back side of drive axle 20 through a transmission 42 which in turn drives a drive shaft 44 which connects to the rear axle 20 through a differential 45. Referring in particular to FIGS. 4 and 5, transmission 42 includes a main double pulley 46 which is affixed to one end of drive shaft 44. Pulley 46 is driven by belts 48, 50 which in turn are driven by pulleys 52, 54 which are affixed to the distal ends of the electric motor shafts 38, 40.

The entire assembly including electric motors, transmission and drive shaft is extremely compact which permits the entire assembly to fit neatly under the rear end of the truck bed, behind the rear axle, without having to jack up the truck or the truck bed. This provides a bed height comparable to the original gas-powered vehicle.

A particular feature and advantage of the present invention which results from the aforesaid layout is that the entire underside of the bed forward from the rear axle 20 is unencumbered and thus larger batteries 22, 24, 56 can be located under the vehicle. Another advantage is that with the heavy batteries in front of the rear axle, the weight is better distributed. There are other advantages. These include better fore-aft weight distribution on the wheels than with aft-mounted batteries, which leads to better handling. Moreover, with mid-mounted batteries, the vehicle has a lower second moment of inertia about the vertical axis than one with aft-mounted batteries. This means it is easier to start and stop the truck turning, and directly leads to better handling. Also, wiring to the batteries is concentrated to one large box instead of having to duplicate wiring and other parts. One box is simpler and cheaper to manufacture than several boxes or one large box with drive components running through it. And, it is better to have all the batteries in one box so they can be kept at a uniform temperature for extended battery life.

Figure 6:
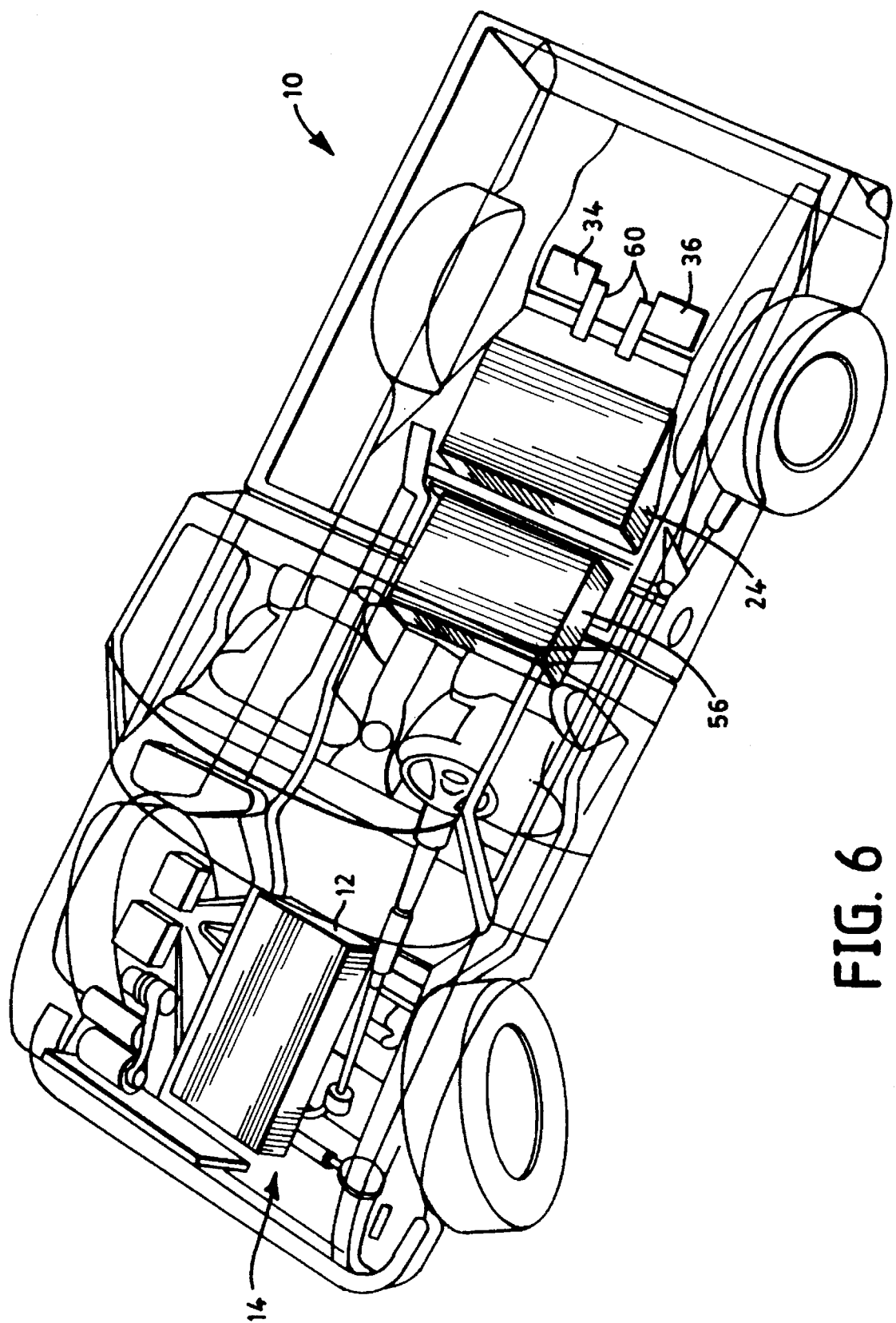
FIG. 6 is a view, similar to FIG. 2, and illustrating a second embodiment of battery-powered electric vehicle made in accordance with the present invention.

The invention is susceptible to modification. Referring to FIG. 6, the electric motors may be arranged parallel to and behind the rear axle, to drive the rear axle from the back side, e.g. through direct drive means 60 such as gears, belts, chains or the like. In such arrangement, the differential may be eliminated.

While the present invention has been described in connection with a pickup truck conversion, the concept of locating the drive motors behind the rear axle, and driving the rear axle from the rear also advantageously may be used in passenger car conversions. The vehicle layout of the present invention also advantageously may be used in connection with a battery-powered electric vehicle built from the ground up as well as hybrid electric vehicles.

Various changes and modifications may be made without departing from the spirit and scope of the invention as set forth herein.

We claim:

1. An electric vehicle comprising a front axle and a rear axle and at least one electric motor having a motor shaft connected through a transmission and a drive shaft to the rear axle, the improvement wherein the said at least one electric motor is located behind the rear axle with its motor shaft facing the rear end of the vehicle, said transmission being located behind the at least one motor and connected to one end of said drive shaft, the other end of which drive shaft drives the rear axle from the rear, and wherein said electric motor shaft runs parallel to the drive shaft.

2. In an electric vehicle according to claim 1, wherein said rear axle is connected to said drive shaft through a differential.

3. In an electric vehicle according to claim 1, wherein said transmission includes a main pulley which is driven through a belt by a second pulley which in turn is driven by said electric motor shaft.

4. In an electric vehicle according to claim 1, and comprising a pair of electric motors.

* * * * *